United States Patent
Brownlee

Patent Number: 5,944,402
Date of Patent: Aug. 31, 1999

[54] MOVING LIGHT DISPLAY AND METHOD

[76] Inventor: Gordon Cameron Brownlee, 5609 Finch Dr., #326, Longview, Wash. 98632

[21] Appl. No.: 09/073,123

[22] Filed: May 5, 1998

Related U.S. Application Data

[60] Provisional application No. 60/045,774, May 6, 1997.

[51] Int. Cl.$^6$ ................................................ G03B 21/28
[52] U.S. Cl. .................................................. 353/50; 353/46
[58] Field of Search .............................. 353/46, 50, 51; 359/223, 225, 226

[56] References Cited

U.S. PATENT DOCUMENTS

| | | |
|---|---|---|
| 3,619,033 | 11/1971 | McMahen . |
| 3,940,202 | 2/1976 | Kato et al. . |
| 3,953,105 | 4/1976 | Ih . |
| 4,094,576 | 6/1978 | Heiling . |
| 4,227,785 | 10/1980 | Herbert ...................................... 353/50 |
| 4,304,459 | 12/1981 | Kramer . |
| 4,327,975 | 5/1982 | Harris ......................................... 353/50 |
| 5,337,221 | 8/1994 | Gordin et al. ............................. 362/66 |
| 5,483,363 | 1/1996 | Holmes et al. .............................. 359/2 |
| 5,749,640 | 5/1998 | Yu ............................................. 353/51 |

*Primary Examiner*—William Dowling
*Attorney, Agent, or Firm*—Gene Scott-Patent Law & Venture Group, Inc.

[57] ABSTRACT

A highly collimated light source is directed at a reflective surface such as a diffraction grating, the grating being moveable with time. Light reflected from the grating is projected onto a display surface such as a scone of a lamp or onto a wall or a display plate. The plate may be transparent so that the light display is transmitted through it to a display surface of frosted glass positioned on the other side thereof.

13 Claims, 2 Drawing Sheets

MOVING LIGHT DISPLAY AND METHOD

The priority date of Provisional #60/045,774 filed May 6, 1997 is claimed in this application.

BACKGROUND OF THE INVENTION

1. Field of the Invention

This invention relates generally to artistic light displays for appliance and design room lighting, and more particularly to such a display using a broadband light source, a reflective medium with artistic pattern, and an imaging screen or background surface for receiving the reflected patterned light for visual artistic display.

2. Description of Related Art

The following art defines the present state of this field:

McMahen, U.S. Pat. No. 3,619,033 describes a light beam scanning apparatus including a rotatable disc having a plurality of focusing elements disposed in an annular or spiral pattern such that an impinging light beam is intercepted in succession by each of the focusing elements and deflected along a plurality of adjacent lines thereby providing, in accordance with the characteristics of the focusing elements, either a two-dimensional scan pattern oriented respectively transverse or parallel to the direction of the focused light or alternatively a three-dimensional scan pattern encompassing the areas of the orthogonal two-dimensional patterns.

Kato et al, U.S. Pat. No. 3,940,202 describes a light beam deflection system for producing diffracted light having a holographic light beam deflection disc bearing a record of unidimensional fringe pattern along the radial axis on a time division basis over a circumferential portion of the light beam deflection disc while rotating the disc.

Homes et al., U.S. Pat. No. 5,483,363 describes a security device includes first and second diffractive structures contained within a surface relief structure. The structures are such that the device responds to illumination at first, visible wavelength to generate a first, visible pattern while any pattern generated by the second structure is not substantially visible at that wavelength, and the device responds to illumination at a second wavelength substantially different from the first wavelength to generate a second pattern suitable for machine reading while any pattern generated by the first structure is substantially suppressed relative to the machine readable pattern at that wavelength.

Kramer, U.S. Pat. No. 4,304,459 describes a holographic scanning system includes a reflective type holographic spinner having a plurality of diffraction gratings on its surface. A reconstruction wavefront incident on a non-grating surface of the spinner is reflected into a corrective optical element which displaces and redirects the wavefront so that it is incident at the grating at an angle corrected for the effects of spinner wobble.

Heiling, U.S. Pat. No. 4,094,576 describes a flat disk contains a number of holograms made from the interference of a plane wavefront with spherical wavefront modified by a first cylindrical lens. The disk is rotated so that a plane reconstruction wave front sweeps across the holograms. The resulting reconstructed wavefront is passed through a second cylindrical lens, resulting in a focussed point sweeping across and object surface in one or more substantially straight lines.

Ih, U.S. Pat. No. 3,953,105 describes an apparatus which includes an optical spinner having a surface rotatable about an axis that is substantially perpendicular to the surface at its point of intersection with the axis. A source of coherent radiation is directed toward the surface and a zone-type lens covering at least a portion of the surface is configured to receive the radiation and direct it toward a first scanning focal point locus. An auxiliary reflective means is disposed in the path of the directed radiation, the reflective means being shaped to redirect the radiation toward a second scanning focal point locus, such that the principal ray of the radiation is substantially perpendicular to the axis. In this manner, the problems generally encountered with no-normal impinging light bundles are overcome.

Gordin et al., U.S. Pat. No. 5,337,221 describes a highly controllable way to light target areas includes a primary reflector which generates a defined primary beam in association with a light source. The primary beam, or at least a portion of the primary beam, is directed onto a secondary reflector which generates a secondary beam to the target space. The secondary reflector can be configured in any number of contours, shapes, specularities, or other characteristics to alter and control the characteristics of the secondary beam. Various options, alternatives, and features are possible with the invention. For example, a plurality of light sources and primary reflectors can be used with one secondary reflector. The surface of the secondary reflector can be corrugated to have alternating segments to direct light in different directions. A combination of light source, primary reflector, and secondary reflector can also be positioned on a moveable base. A plurality of secondary reflectors and light sources a primary reflectors can be positioned on one moveable base and can be oriented in different configurations for different lighting effects.

The prior art teaches various light projection and reflection systems for producing artistic visual displays. However, the prior art does not teach that the white light may be excluded from the display by producing a highly collimated and screened light source and directing its beam at a diffraction grating or hologram plate in such a manner as to suppress and diminish white light creation and propagation. The present invention fulfills these needs and provides further related advantages as described in the following summary.

SUMMARY OF THE INVENTION

The present invention teaches certain benefits in construction and use which give rise to the objectives described below.

In its most elementary form, the present invention provides a highly collimated light source that is directed at a reflective surface such as a diffraction grating or a holographic plate, either one of which is moved with time so as to produce an interesting light design for display in an appliance, such as in a lamp. The light source may also be moved so as to allow the reflective surface to remain stationary. Light reflected from the surface is received on a display surface such as a lamp scone or onto a wall or a display plate as shown in the figures. The display surface may be strategically placed so as to eliminate shadows. The plate may be transparent so that the light display is transmitted through it to a display surface of frosted glass positioned on the other side thereof. The relationships between beam diameter, reflective surface distance from the beam source and position of the display surface are considered important novel elements in the present invention.

A primary objective of the present invention is to provide a light display having advantages not taught by the prior art.

Another objective is to provide such a display that is void of a majority of white light, glare, and scattered light, and includes a highly focused and distinctly colorful image.

A further objective is to produce such a display that has the property of changing or moving with time.

A still further objective is to provide a method of use of such a display device.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
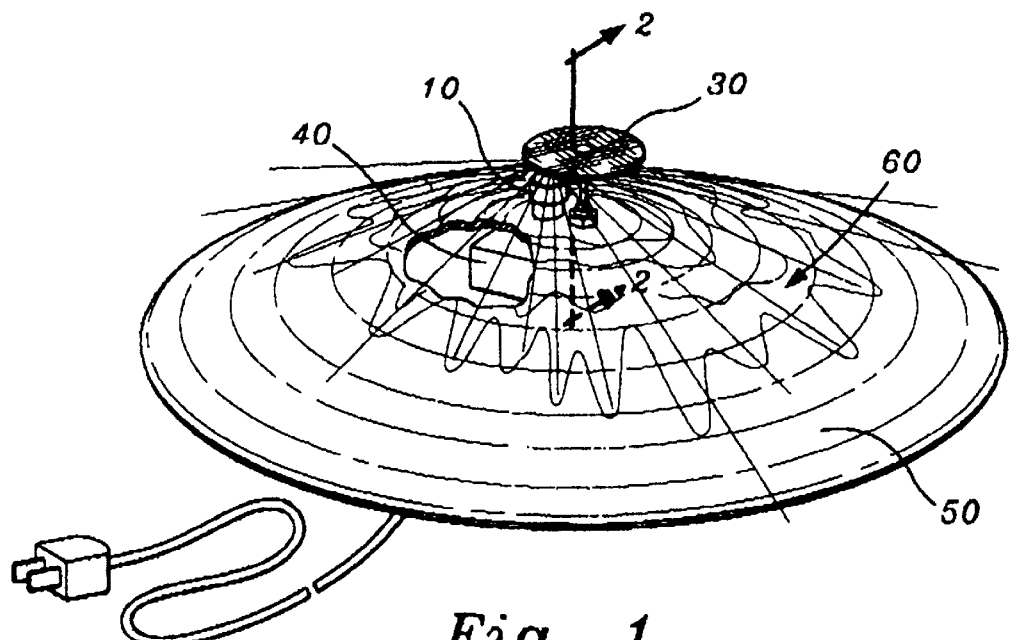
FIG. 1 is a perspective view of the preferred embodiment of the present invention apparatus, showing a first embodiment whereby a surface receives a light display that revolves with time.

The above described drawing figures illustrate the invention, a spectral light display apparatus comprising a light source means 10 for producing at least one beam of light 20; a reflective medium means 30 positioned for receiving and reflecting the at least one light beam 20; a motion drive means 40 for moving points of intersection between the at least one light beam 20 and the reflective medium means 30; and an imaging surface means 50 positioned for receiving at least one light display 60 of the at least one light beam 20 reflected from the reflective medium means 30. The preferred embodiments, as shown in the figures are addressed here, but should be considered as examples of a broader range of similar and, in some instances, more complex arrangements of the same elements and their interrelationship. Establishment of the distance between the reflective medium means 30 and the light source means 10, in the present case, the light emitting aperture 22, and the diameter of the light beam 20, and the relationship between these to elements of the present invention, have been found to enable exclusion of a majority of white light from the light display 60. This establishes the manner in which the present invention distinguishes over the prior art. Preferably, for a light display of practical size for use as an indoor appliance, as for instance as a lamp display in a residential or office area, the light beam 20 must be less than 1 cm in diameter at the aperture 22, assuming a very minor angle of divergence in the beam 20, and the distance from the aperture 22 to the reflective medium 30 should not exceed 3 cm. When these dimensions are adhered to, it has been found that surprisingly superior color, color separation, and exclusion of white light is achieved in the display. This has not been found or disclosed in the prior art. It is important to realize that reflected light originating from spectral light sources produces spurious light scatter and white light productions, both of which interfere with the production of a clear, colorful and focussed art display. Also, a white spot is produced which interferes with the appearance of the display. These problems are overcome through the use of the present invention.

Figure 4:
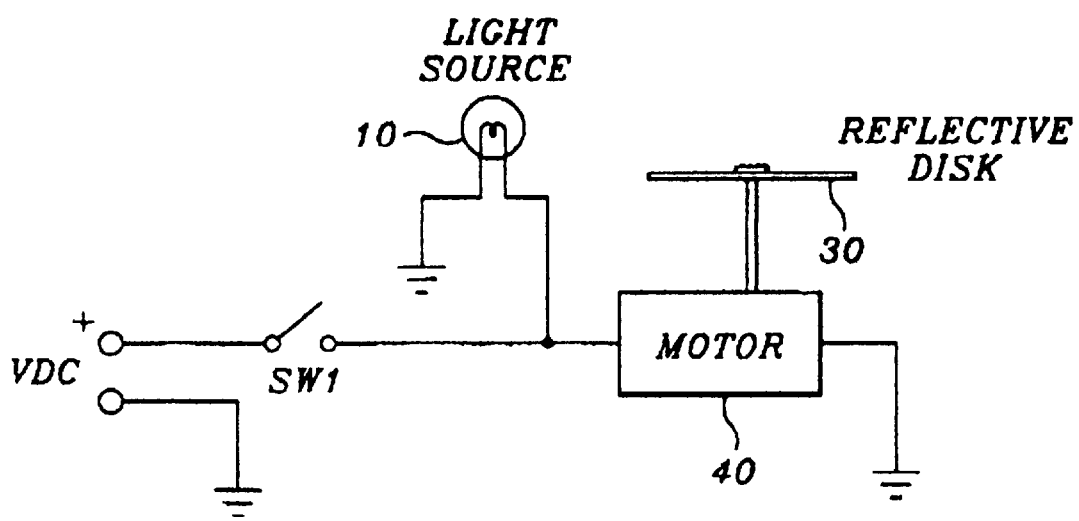
FIG. 4 is an electrical surface of the embodiments shown in FIG. 1 or FIG. 3.

It should be noted that the production of an inexpensive and highly collimated light beam 20 in this invention, includes the use of a fully opaque tube 12 within which is placed a light emitter such as an electric bulb (not shown), the bulb being placed at a distance from the light emitting aperture 22 of the tube 12. The apparatus is based upon the elementary electric circuit as shown in FIG. 4 which includes switch SW1 for activating the circuit.

Preferably, the reflective medium 30 is a disk-shaped rigid diffraction grating means or holographic plate means and may include various filters for changing the hue or color of the light reflected therefrom. There are a multitude of other reflective surfaces one may substitute for the above two possibilities, but the diffraction grating means and holographic plate means have been found to produce such superior results as to be considered major discoveries of a very novel and inventive nature in the present application. In particular the images formed from these two reflective mediums, in the manner of this application, are clearer, more fully focussed and exhibit much less white light resulting from reflection.

Preferably, the motion drive means 40 is an electric motor such as a battery operated clock motor. Preferably, the reflective medium means is fixed to a drive shaft means 42 such as a straight shaft of the electric motor, and is positioned so as to rotate about the drive shaft means 42. In this manner the reflective medium means 30 may be manipulated to bring various aspects or facets of its surface into contact with the light beam 20 over time.

Figure 2:
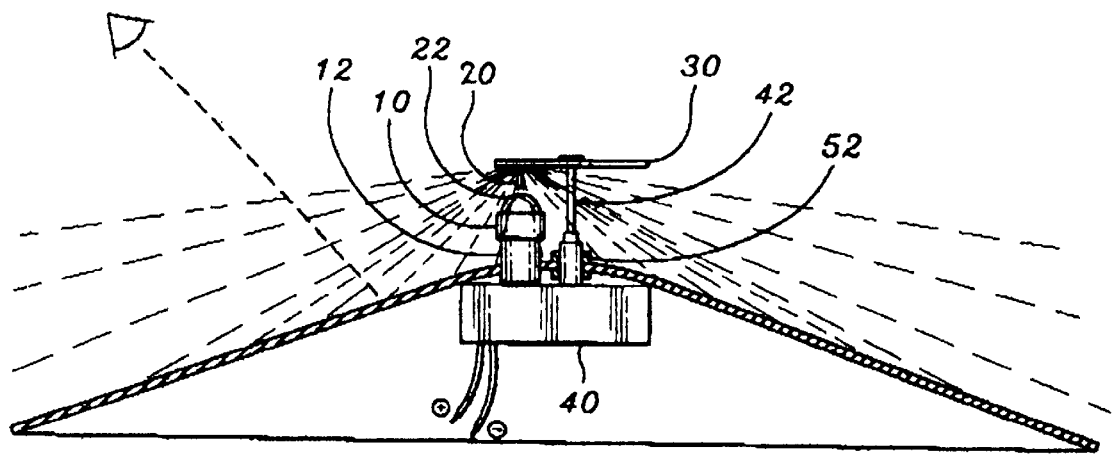
FIG. 2 is a section view thereof taken along line 2—2 in FIG. 1, showing further details of such apparatus.

Preferably, the imaging surface 50 (FIG. 1) provides a support means 52, such as mounting holes, for engaging the motion drive means 40 and the light source means 10 in mutually adjacent positions as best seen in FIG. 2.

Preferably the imaging surface is convex, as shown in FIGS. 1 and 2, with the motion drive means 40 and the light source means 10 being mounted at the apogee of the imaging surface in adjacent positions, as best seen in FIG. 2. Please notice that the imaging surface may be positioned at any angle with respect to the reflecting surface, i.e. a solid angle range of 90 degrees is theoretically possible.

Figure 3:
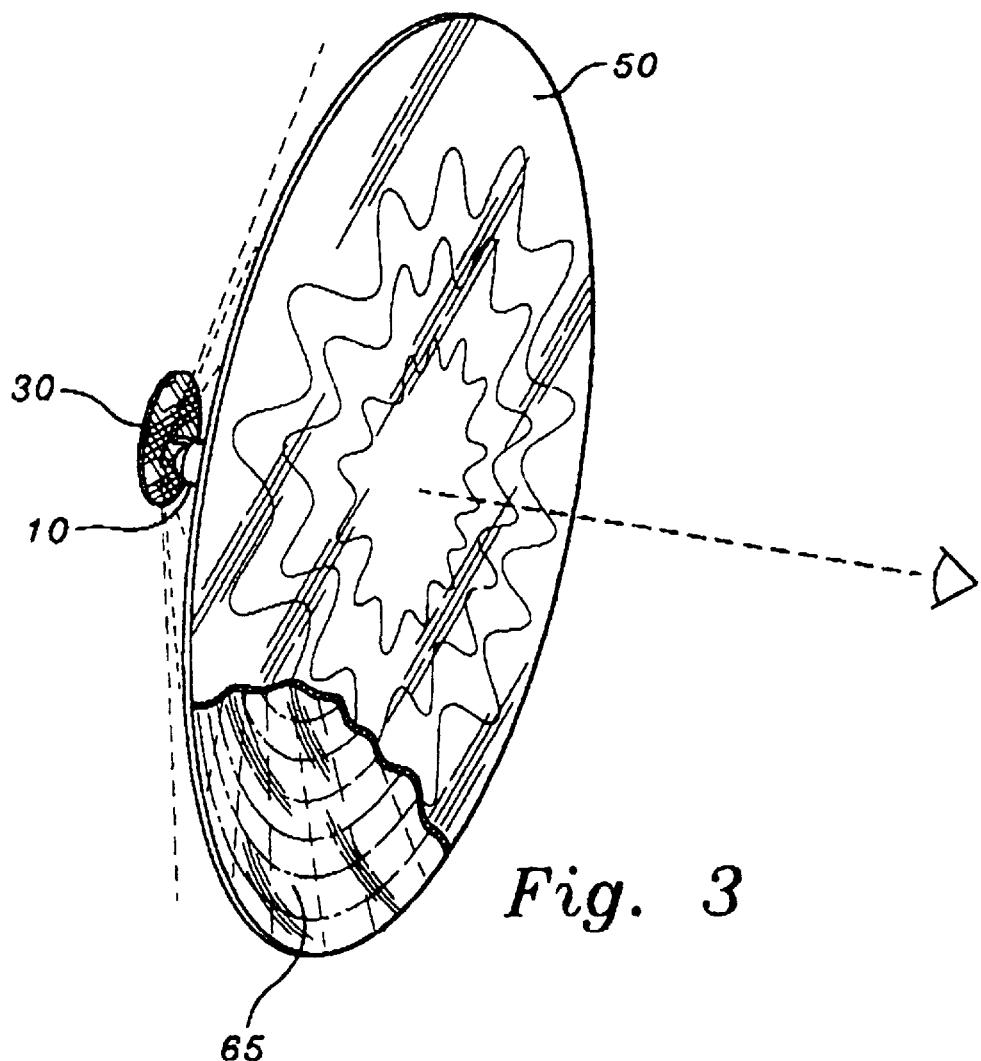
FIG. 3 is a further embodiment showing a translucent surface receiving the light display as transmitted through a transparent mounting surface.

Alternately, the motion drive means 40 and the light source means 10 may be supported in place by a mounting plate means 65 which is preferably, but not necessarily, of a transparent material, as seen in FIG. 3. Construction of the mounting plate means 65 may be of plastic or glass, the mounting plate means 65 providing a means for supporting the drive means 40 and the light source means 10 in mutually adjacent positions, as shown in FIG. 2. As shown in FIG. 3, the mounting plate means 65 may be attached to the imaging surface 50 which is positioned, in this alternate embodiment, such that the light display 60 is incident upon the imaging surface 50 after passing through the mounting plate means 65. The advantage, here, is that the light source and reflective surface are not visible to the viewer. Such an arrangement is considered novel in the art.

Preferably, the light source means 10 comprises a light emitting element, such as a common incandescent light bulb enclosed within an opaque tubular member 12 having an aperture 22 at one end thereof, the aperture 22 being of sufficient distance from the light emitting element and of sufficiently diminished size, as to enable the light source means 10 to form the light beam in a highly collimated configuration. Further, the reflective medium 30 is preferably at a sufficient distance from the imaging surface 50 as to be well focused and to eliminate white light from the light display 60. This is accomplished most appropriately when the at least one beam of light 20 and the reflective medium means 30 are at orthogonal juxtaposition, i.e. when the light beam 20 strikes the reflective medium 30 normally. It has been discovered that when this occurs, white light is reflected directly back toward the light emitter so that it does not appear in the light display 60. This is a significant improvement over the prior art which has not discovered this manner of eliminating the white light spot normally present in such displays, nor of eliminating a white light halo that often appears peripherally in light displays. Alternately, the angle of incidence between the light beam 20 and the reflective medium 30 may be set at other then normal, in which case the white light reflected spot is moved laterally with respect to the light source means 10 and appears on the imaging surface 50. In this case, the apparatus is preferably constructed in such a manner as to prevent viewing of the portion of the imaging surface 50 that displays the white light spot. In FIG. 2, for instance, it is not possible for the viewer shown, to see the right hand portion of the imaging surface. The construction of the convex viewing surface, therefore, provides such advantages as is not known in the prior art in such a combination.

The method for producing the above spectral light display 60 preferably comprising the steps:

a) placing the light source means 10 adjacent to the reflective medium means 30 and at approximately right angles thereto and at a distance of not more than 3 cm;

b) projecting the at least one light beam 20 of not more than 1 cm diameter from the light source means 10 onto the reflective medium means 30;

c) reflecting the at least one light beam 20 from the reflective medium means 30 to form the light display 60;

d) moving the point or points of intersection between the at least one light beam 20 and the reflective medium means 30 as a function of time;

e) imaging the light display 60 onto an imaging surface 50 for viewing.

Further, the light source means 10 may be mounted onto a transparent plate or bracket 65 in order to transmit the light display through the transparent plate, 65 as shown in FIG. 3, so as to intersect with the imaging surface 50 which would advantageously be frosted so as to image the light display 60 for viewing from the reverse side as seen in FIG. 3.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A spectral light display apparatus comprising:

a light source means for producing at least one beam of light of not more than 1 cm in diameter;

a reflective medium means positioned not further than 3 cm from the light source means, for receiving and reflecting the at least one light beam;

a motion drive means for moving points of intersection between the at least one light beam and the reflective medium means; and an imaging surface means positioned for receiving at least one light display of the at least one light beam reflected from the reflective medium means and excluding a majority of white light from the at least one light display.

2. The apparatus of claim 1 wherein the reflective medium is a rigid diffraction grating means.

3. The apparatus of claim 1 wherein the reflective medium is a rigid holographic plate means.

4. The apparatus of claim 1 wherein the motion drive means is an electric motor means, the reflective medium means being fixed to a drive shaft means of the electric motor means, and positioned so as to rotate about the drive shaft means.

5. The apparatus of claim 1 wherein the imaging surface provides a support means for engaging the motion drive means and the light source means in mutually adjacent positions.

6. The apparatus of claim 5 wherein the imaging surface is convex, with the motion drive means and the light source means being mounted at the apogee of the imaging surface.

7. The apparatus of claim 1 further providing a mounting plate means of a transparent material, the mounting plate means providing means for supporting the drive means and the light source means in mutually adjacent positions.

8. The apparatus of claim 7 wherein the imaging surface is positioned such that the light display is incident upon the imaging surface after passing through the mounting plate means.

9. The apparatus of claim 1 wherein the light source comprises a light emitting element enclosed within an opaque tubular member having an aperture at one end thereof, the aperture being of sufficient distance from the light emitting element and of sufficiently diminished size, as to enable the light source to form the light beam in a highly collimated configuration.

10. The apparatus of claim 1 wherein the at least one beam of light and the reflective medium means are at orthogonal juxtaposition.

11. A method for producing a spectral light display, the method comprising the steps:

f) placing a light source means at a distance of not more then 3 cm from a reflective medium means;

g) projecting at least one light beam of not greater than 1 cm diameter from the light source means onto the reflective medium means;

h) reflecting the at least one light beam from the reflective medium means as a light display;

i) moving the points of intersection between the at least one light beam and the reflective medium means;

j) imaging the light display onto an imaging surface for viewing.

12. The method of claim 11 further providing the step of mounting the light source means onto a transparent plate.

13. The method of claim 12 further providing the step of transmitting the light display through the transparent plate so as to intersect with a translucent imaging surface.

\* \* \* \* \*